United States Patent Office 3,316,927
Patented May 2, 1967

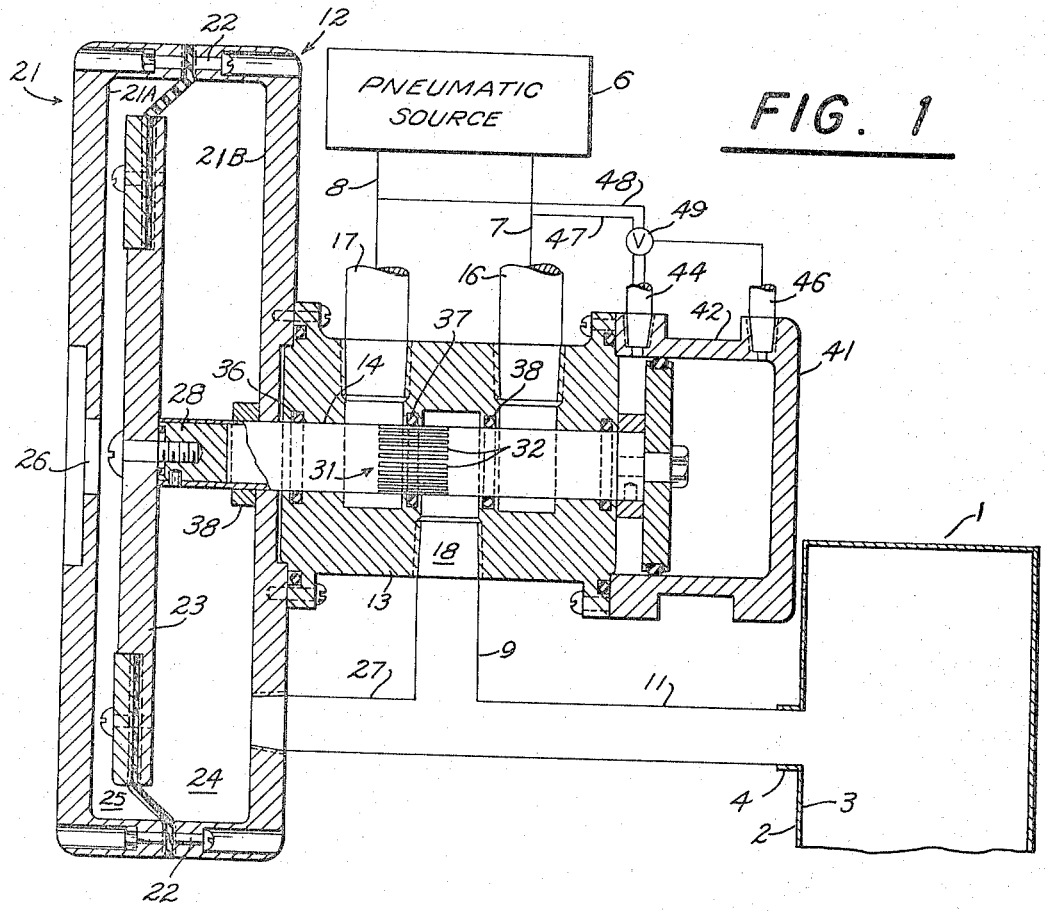
FIG. 1
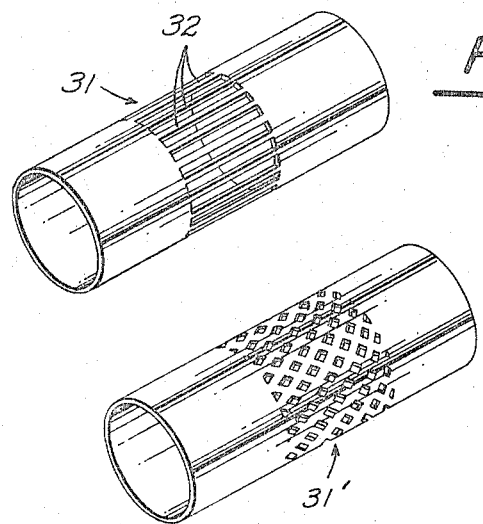
FIG. 2
FIG. 3
INVENTOR.
KEITH M. BURTON
BY
ATTORNEYS

3,316,927
APPARATUS FOR REGULATING THE DIFFERENTIAL PRESSURE OF A HOLLOW SUBMERGED BODY
Keith M. Burton, El Cajon, Calif., assignor to the United States of America as represented by the Secretary of the Navy
Filed Dec. 21, 1964, Ser. No. 420,222
6 Claims. (Cl. 137—102)

The invention described herein may be manufactured and used by or for the Government of the United States of America for governmental purposes without the payment of any royalties thereon or therefor.

The present invention relates to pressure regulators and, in particular, to regulating apparatus for maintaining a substantially fixed differential pressure between the exterior and interior surfaces of a hollow submerged body.

The principle of the present invention best can be understood with reference to underwater transducers which, generally considered, are hollow bodies usually submerged to varying depths in sea water for the purpose of converting acoustic energy to electrical energy or vice versa. Obviously, as the depth of the transducer in the sea water is varied, the differential pressure between its exterior and interior surfaces may vary radically and, in many cases, the pressure variation materially affects the efficiency and power of the transducer driving elements.

By way of an example, one particular transducer employed by the U.S. Navy utilizes plate-like driving elements in an interleaved grid configuration and, in this arrangement, the spacing and distribution is so critical that the transducer response varies measurably when subjected to changes in differential pressure as little as one half pound or six inches of water pressure. Also, this particular transducer normally is carried in a flooded compartment of a submarine so that the differential pressure varies its operating depth. As another incidental consideration, it is known that the differential pressure also varies in response to wave conditions in the ocean.

The same considerations apply to a variety of other hollow bodies such as underwater cameras, manned submersibles and, in fact, any similar cavity having a casing of such limited strength that it must be protected by maintaining the differential pressure within well defined limits.

It is, therefore, a primary object of the present invention to provide pressure compensating or regulating means for maintaining a substantially fixed differential pressure between the exterior and interior surfaces of a hollow body as the external water pressure on the body varies.

A further important object is to assure a rapid and precise compensation capable of accurately responding to changes in differential pressure of less than one-half pound or six inches of water pressure.

Another significant object is to provide a simply designed, space-saving regulator capable of being economically constructed and mounted within the limited confines of a submarine hull.

Another object, which will be clarified in the ensuing detailed description, is to provide a special regulator valve arrangement capable of permitting high-pressure air passage for pressure-compensating purposes while, at the same time, permitting the use of simple O-ring seals to constrain the air flow.

Yet another object is to provide a regulator which is independent of electrical controls and which also, if so desired, may be stationed apart from the unit being controlled.

A further object is to provide a biasing unit by means of which the differential pressure can be regulated.

Other objects and their attendant advantages will become apparent in the ensuing detailed description.

In a general manner these objects are achieved by utilizing a differential pressure-sensing diaphragm to drive a sliding valve piston which, in turn, supplies or vents the proper amount of pneumatic pressure to or from both the hollow body and the sensing diaphragm so as to compensate for any change in differential pressure and permit the sensing diaphragm to return to a normal position. In a preferred embodiment of the invention, the sliding valve piston also is biased by pneumatic pressure so as to resist or augment the diaphragm drive according to the demands of the system.

As a further important feature, the sliding piston valve is provided with a specially-formed valve port in the form of longitudinally (axially) extending slots or, in an alternative embodiment, the porting may be accomplished through a screen-like member which, as will be appreciated, also has longitudinal slots. In either event, the slot or the screen are substantially continuous with the external peripheral surfaces of the piston valve so as to avoid any circumferential indentations in the valve periphery such, for example, as would be present if circumferentially extending ports were employed. As will be better understood in the subsequent detailed description, the avoidance of indentations of this type enable the use of simple O-ring sealing members to constrain the air flow as it passes through the ports and on to the diaphragm and to the submerged transducer cavity.

The preferred embodiment of the invention is illustrated in connection with the accompanying drawing in which:

FIGURE 1 is a diagrammatic sectional view illustrating an apparatus employing the pressure regulating means of the invention;

FIGURE 2 illustrates one embodiment of the cylindrical port section of the piston valve employed in the pressure regulating means; and FIGURE 3 illustrates another embodiment of the cylindrical port section.

Referring to FIG. 1, numeral 1 represents the so-called hollow body or transducer and, for descriptive purposes, the transducer can be considered as being formed of a casing having an exterior surface 2 and interior surface 3, as well as interior driving elements, such as interleaved electro-acoustic plates (not shown). In normal usage, the transducer, is supplied with air pressure through a fitting 4 so as to maintain a substantially constant differential pressure between its exterior and interior surfaces. Some presure regulating means normally is employed for this purpose, these means functioning either to admit a controlled amount of air into the transducer cavity or to vent the cavity sufficiently to equalize a pressure drop. Consequently, a source of pneumatic pressure, such as is represented by numeral 6, is employed and this source is communicated with transducer 1 through the regulator means. More specifically, as schematically illustrated in FIG. 1, source 6 is coupled to the regulator through a high pressure supply line 7 and an exhaust or vent line 8. Air line 9, also coupled to the regulator means completes the pneumatic circuit by conducting the air flow to or from body 1 through another air line 11, which, as will be seen, is coupled to fitting 4.

As has been indicated, a pneumatic circuit of this type normally would be used in a differential pressure compensating system of the type under consideration. Various arrangements are possible. For example, the pneumatic source can either be an air compressor or tanks of compressed air. In the presently contemplated transducer application, the equipment is mounted in a flooded compartment of a submarine so that a motor-driven air compressor can be employed. If, however, hollow body were a manned submersible or an underwater camera, probably would be preferable to substitute air tanks.

The principal features of the present invention reside in the structure and arrangement of the regulator means, designated by numeral 12, this means, of course, being employed to control the flow of compressed air to and from the transducer. As illustrated in FIG. 1, the present regulator means is formed of an elongate central section 13 provided with a central bore 14 and also with high pressure inlet and exhaust ports 16 and 17, as well as a diametrically disposed port 18 which, obviously, permit a transverse flow of the air pressure through the central section of the regulator. The ports are coupled to the previously mentioned high pressure line 7 and exhaust line 8, as well as air lines 9 and 11 which, in turn, lead directly into the transducer.

Bolted or otherwise secured to the left-hand end (FIG. 1) of central section 13 is a diametrically enlarged sensing chamber 21 preferably formed of two mating parts 21a and 21b bolted together by a plurality of circumferentially spaced bolts 22 which bolts also securely clamp a sensing diaphragm 23. The diaphragm, as will be noted, partitions chamber 21 into interior and exterior compartments 24 and 25. Preferably the diaphragm is formed of an aluminum alloy disc that clamps on its peripheral edge a flexible neoprene member, the latter being clamped in position between parts 21a and 21b of the sensing chamber.

The function of diaphragm 23 is to sense variations both in ambient pressure as well as the interior pressure of transducer body 1. Accordingly, compartment 25 is formed with an opening 26 admitting sea water to the exterior side of the diaphragm. Also, compartment 24 is provided with an inlet into which is coupled an air line 27 which, as shown, communicates directly with lines 9 and 11. Obviously, increases or decreases of pressure within transducer body 1 are applied to the interior side of diaphragm 23. Consequently, the diaphragm experiences the same variations of differential pressure as the transducer. Further, high pressure air from source 6, as well as venting to the source, are effected simultaneously at both the transducer body 1 and interior compartment 24 of the sensing chamber.

Centrally bolted to diaphragm 23 is a sliding piston valve 28 which reciprocates to and fro axially of bore 14 as the diaphragm moves to the right or left in response to pressure variations.

Reciprocation of piston valve 28 establishes either an air supply or an air vent condition which, in turn, compensates for differential pressure variation due to varying depths of operation. Accordingly, piston valve 28 is provided medially with a special cylindrical port section 31, the construction of which provides one of the features of the present invention. More specifically cylindrical port section 31 is formed of a series of longitudinal ribs 32 which are circumferentially spaced to form the necessary slotted ports for an air flow. In particular, ribs 32 are essentially continuous with the periphery of the adjacent cylindrical portions of valve 28, i.e., the ribs have the same external diameter as the cylindrical piston valve.

Although longitudinal ribs are entirely suitable for certain purposes, it also should be appreciated that the central port section can be formed of perforations providing a screen-like structure 31' shown in FIG. 3. A screen of this type may be found to be a simpler and less expensive element than the ribs of FIG. 1.

The principal reason for the special construction of section 31 is to enable the use of simple O-ring seals, such as O-ring seals 36, 37, 38 and 39 shown in FIG. 1. These O-ring seals, of course, are used to contain the air flow as it passes transversely through central section 13 in its travel from the air source to or from the transducer and the sensing chamber.

The advantage of the particular construction of central section 31 can better be appreciated if it is assumed that conventional circumferentially-extending holes or ports were employed in place of ribs 32. Assuming the use of such holes, it is obvious that reciprocation of the piston eventually would cause the O-rings to ride into the holes and contract with the result that their sealing action would be completely lost. Since the ribs of FIG. 2, or the screen of FIG. 3, are continuous with the external periphery of piston valve 28, there is no danger of the O-rings riding laterally into inoperative positions.

The positioning of central section 31 is somewhat conventional in that, in its normal position, it blocks any flow transversely through the central section 13 of the regulator. When moved to its left hand position, illustrated in FIG. 1, air lines 8 and 9 are communicated so as to permit an exhaust of air simultaneously from hollow body 1 and interior compartment 24 of sensing chamber 21. When moved to an extreme right hand position, a high pressure input is supplied from the pneumatic source simultaneously to the hollow body and the interior compartment.

In operation, as hollow body 1 and the regulator are lowered in depth, the increased water pressure, acting upon diaphragm 23, drives the diaphragm to the right causing the piston valve with its central porting section 31 to move to the right to establish a high pressure input through lines 7, 9, 11 and 27 simultaneously to the hollow body and to interior compartment 24. Preferably, sensing chamber 12 mounts a stop 38 which limits the movement of the diaphragm to the right. The supply of high pressure to the interior of hollow body 1 compensates for the increased ambient pressure acting upon the body and consequently tends to maintain a constant differential pressure. The maintenance of the differential pressure is permitted by the fact that high pressure also is applied to interior compartment 24 to act upon the right hand side of diaphragm 23 and thereby cause the diaphragm to return to its normal position at which central port section 31 shuts off any further air flow. Obviously, the reverse of the foregoing situation occurs when the ambient pressure is reduced. In this instance the diaphragm moves to the left, positioning central porting section 31 so as to exhaust a measured amount of air both from the hollow body and interior compartment 24. When the desired differential pressure is restored, diaphragm 23 returns to its normal position in which central porting section 31 blocks any further flow of air.

A further feature of the invention is provided by a so-called bias controlled unit, designated generally by numeral 41. As may be seen in FIG. 1, unit 41 essentially is a second chamber 42 bolted to the right hand side of central cylindrical section 13 of the regulator. Interially of chamber 42 is mounted a bias piston 43 which as will be seen, is secured to the right hand end of sliding piston valve 28. Chamber 42 also has two air ports 44 and 46 coupled by lines 47 and 48 to high pressure lines 7 and 8, respectively. A valve 49 may be employed in lines 47 and 48 to permit the high pressure to be applied either to the right or the left hand side of valve piston 43. Such a valve can be entirely conventional and, if desired, it can be operated from a remote position through a conventional solenoid hook-up.

The purpose of the biasing arrangement is to provide either a negative or a positive bias for controlling the movement of diaphragm 23 and of piston valve 28 which it drives. Thus, if high pressure is applied to the right hand side of bias piston 43, piston valve 28 cannot be driven to the right until the differential pressure is sufficient to overcome the fixed bias on piston 43. If increased sensitivity of movement of piston 28 is desired, pressure may be applied to the left hand side of piston 43 so as to augment the movement of the diaphragm and the cylindrical piston valve coupled to it. By this means, fixed differential pressures can be maintained. It also will be appreciated that the bias unit, as a whole, could be replaced by a coil spring, or the like, bearing against piston valve 28, although the pneumatic bias is more precise and permits greater flexibility.

With an arrangement of the type which has been described, the regulator is capable of controlling differential pressures to withstand one-half pound or six inches of water pressure differential. Its operation has proven quite precise and reliable and, as will be appreciated, the precision is achieved by the use of a simple sliding valve and equally simple and inexpensive O-ring seals. Further, the unit is quite compact so as to occupy the minimum amount of space if employed in such environment as a flooded compartment of a submarine.

Obviously many modifications and variations of the present invention are possible in the light of the above teachings. It is therefore to be understood that within the scope of the appended claims the invention may be practiced otherwise than as specifically described.

What is claimed is:

1. Pressure compensating apparatus for maintaining a constant differential pressure between exterior and interior wall surfaces of a water-submerged gas filled body comprising:
   a regulator casing disposed in close proximity to said submerged body, said casing having an elongate central section closed at one end and formed at the other end into a diametrically-enlarged sensing chamber,
   said central section being provided with a longitudinal bore opening into said sensing chamber and also with gas inlet and outlet ports arranged to permit a transverse pressurized gas flow through said section,
   a diaphragm partitioning said sensing chamber into interior and exterior compartments, the latter compartment having an exterior wall provided with an opening admitting ambient water,
   a cylindrical piston valve mounted for axial reciprocation in said bore and secured at one end to said diaphragm,
   said valve having a cylindrical port section substantially equal in diameter to said bore and formed of a plurality of closely spaced perforations,
   a gas pressure circuit for supplying and venting gas pressure through said casing and piston valve simultaneously to said submerged body and to said interior sensing chamber compartment and simultaneously from said body and interior compartment,
   said casing ports and valve port section being disposed for alternately establishing the supply and vent conditions of said circuit in response to reciprocations of said diaphragm-driven piston valve from a normal flow-arresting position,
   said diaphragm being movable in response to ambient pressure variations in said sensing compartment whereupon said piston valve is driven for establishing a gas pressure flow capable of simultaneously compensating for the differential pressure variation in said submerged body and said interior compartment,
   said compensating flow causing said diaphragm to return said piston valve to a normal flow-arresting position.

2. The compensating apparatus of claim 1 wherein said apparatus further includes O-ring sealing members mounted on the exterior surface of said cylindrical piston valve for sealably restricting the supply and venting gas flow in its passage through said casing central section.

3. The compensating apparatus of claim 2 wherein said cylindrical port section is formed of circumferentially spaced ribs.

4. The compensating apparatus of claim 2 wherein said diaphragm is formed of a rigid central portion and a flexible portion carried peripherally on said central portion, said flexible portion being peripherally clamped by said sensing chamber.

5. The compensating apparatus of claim 2 wherein said apparatus further includes means for biasing said piston valve in opposition to said diaphragm driving force for establishing a fixed differential pressure level below which said diaphragm remains in its normal flow-arresting disposition.

6. The compensating apparatus of claim 5 wherein said means for biasing said piston valve member includes a biasing chamber formed at said closed end of said elongate central casing;
   said piston valve extending into said biasing chamber,
   a bias piston mounted on said piston valve within said chamber, and
   pneumatic means for biasing said piston valve.

References Cited by the Examiner

UNITED STATES PATENTS

| | | | |
|---|---|---|---|
| 1,582,896 | 5/1926 | Berry | 137—505.13 X |
| 2,495,160 | 1/1950 | Davis | 137—102 X |
| 2,825,308 | 4/1958 | Klee | 137—81 X |

FRANK J. COHEN, *Primary Examiner.*

G. F. MAUTZ, *Assistant Examiner.*